(12) United States Patent
Hong

(10) Patent No.: US 11,779,875 B2
(45) Date of Patent: Oct. 10, 2023

(54) MODULAR OXYGEN GENERATOR

(71) Applicant: PURITECH Co., Ltd., Asan-si (KR)

(72) Inventor: Seung Hun Hong, Asan-si (KR)

(73) Assignee: PURITECH CO., LTD., Asan-si (KR)

( * ) Notice: Subject to any disclaimer, the term of this patent is extended or adjusted under 35 U.S.C. 154(b) by 514 days.

(21) Appl. No.: 17/040,976

(22) PCT Filed: Apr. 5, 2018

(86) PCT No.: PCT/KR2018/004021
§ 371 (c)(1),
(2) Date: Sep. 24, 2020

(87) PCT Pub. No.: WO2019/194332
PCT Pub. Date: Oct. 10, 2019

(65) Prior Publication Data
US 2021/0039038 A1    Feb. 11, 2021

(51) Int. Cl.
*B01D 53/047* (2006.01)
*C01B 13/02* (2006.01)
*B01D 53/04* (2006.01)

(52) U.S. Cl.
CPC ....... *B01D 53/0446* (2013.01); *B01D 53/047* (2013.01); *C01B 13/0259* (2013.01); *B01D 2256/12* (2013.01); *B01D 2257/102* (2013.01)

(58) Field of Classification Search
CPC ............ B01D 53/0407; B01D 53/0446; B01D 53/0462; B01D 53/047; B01D 53/04; B01D 2253/108; B01D 2256/12; B01D 2257/102; B01D 2259/40088; C01B 13/0259

USPC ..................................... 96/121, 133; 95/130
See application file for complete search history.

(56) References Cited

U.S. PATENT DOCUMENTS

| 5,578,115 A | * | 11/1996 | Cole | .................. | B01D 53/0446 |
| | | | | | 96/151 |
| 5,997,612 A | * | 12/1999 | Doong | ................. | B01D 53/047 |
| | | | | | 96/144 |
| 2003/0188635 A1 | * | 10/2003 | Lomax, Jr. | ......... | B01D 53/0446 |
| | | | | | 96/124 |

(Continued)

FOREIGN PATENT DOCUMENTS

| CN | 1805777 A | 7/2006 |
| CN | 101993044 A | 3/2011 |

(Continued)

*Primary Examiner* — Frank M Lawrence, Jr.
(74) *Attorney, Agent, or Firm* — PARK, KIM & SUH, LLC

(57) ABSTRACT

A modular oxygen generator includes a tank assembly having a plurality of tanks coupled to one another, a lower pipe assembly disposed on a lower portion of the tank assembly and provided with pipes to supply air to the tank assembly and to discharge nitrogen, and an upper pipe assembly disposed on an upper portion of the tank assembly and provided with pipes to discharge oxygen generated in the tank assembly. The tank assembly includes a plurality of beds each of which is formed of a pair of oxygen collection tanks, an air tank storing air to be supplied to the oxygen collection tanks, and an oxygen tank receiving and storing oxygen from the oxygen collection tanks. The lower pipe assembly includes a manifold having a plurality of channels, and a plurality of first valves coupled to the manifold.

11 Claims, 16 Drawing Sheets

(56) References Cited

U.S. PATENT DOCUMENTS

| | | | |
|---|---|---|---|
| 2005/0005771 A1* | 1/2005 | Lomax, Jr. | B01D 53/047 96/121 |
| 2008/0047426 A1 | 2/2008 | Dolensky | |
| 2008/0184890 A1 | 8/2008 | Lomax et al. | |
| 2011/0315140 A1* | 12/2011 | Shuman | A61M 16/101 128/205.24 |
| 2017/0113173 A1 | 4/2017 | Fowler et al. | |

FOREIGN PATENT DOCUMENTS

| | | | |
|---|---|---|---|
| CN | 203781834 U | | 8/2014 |
| JP | H11-192410 A | | 7/1999 |
| JP | 2001-507982 A | * | 6/2001 |
| JP | 2007-527307 A | | 9/2007 |
| JP | 2008-155168 A | | 7/2008 |
| KR | 20-0359140 Y1 | | 8/2004 |
| KR | 10-2004-0094515 A | | 11/2004 |
| KR | 10-2006-0009991 A | | 2/2006 |
| KR | 10-2011-0019022 A | | 2/2011 |

* cited by examiner

MODULAR OXYGEN GENERATOR

CROSS-REFERENCE TO RELATED APPLICATIONS

This application is the National Stage filing under 35 U.S.C. 371 of International Application No. PCT/KR2018/004021, filed on Apr. 5, 2018, the contents of which are all hereby incorporated by reference herein in their entirety.

TECHNICAL FIELD

The present disclosure relates to an oxygen generator, and more particularly, to a modular oxygen generator which includes a tank assembly provided with a plurality of oxygen collection tanks, and pipe assemblies disposed on an upper portion and a lower portion of the tank assembly, respectively.

BACKGROUND ART

An oxygen generator is a device which generates oxygen by using a chemical reaction or by separating oxygen from air, and today, the oxygen generator is widely used in various fields for industrial, medical and family use. FIG. 1 is a view schematically illustrating a structure of a related-art oxygen generator, and illustrates an exemplary structure of using pressure swing adsorption (PAS) to separate oxygen from air. The oxygen generator includes an air tank 1 for supplying compressed air, two oxygen collection tanks 2, 3 for separating nitrogen and oxygen from the air supplied from the air tank 1, and an oxygen tank 4 for storing oxygen generated in the oxygen collection tanks.

The oxygen collection tanks 2, 3 include an adsorbent such as Zeolite, and separates and concentrates oxygen by using a principle that nitrogen in the air is adsorbed onto the adsorbent under pressure. The compressed air is supplied to the first oxygen collection tank 2 from the air tank 1 through a pipe P1 by opening a valve V1 and a valve V3. When the air passes through the first oxygen collection tank 2, nitrogen is adsorbed onto the adsorbent and oxygen is discharged to the oxygen tank 4.

When nitrogen is sufficiently adsorbed onto the adsorbent of the first oxygen collection tank 2, the air is supplied to the second oxygen collection tank 3 by opening a valve V2. The valve V3 is switched to allow oxygen to be discharged to the oxygen tank 4 form the second oxygen collection tank 3, and accordingly, nitrogen is adsorbed onto the adsorbent in the second oxygen collection tank 3 and oxygen is discharged to the oxygen tank 4. At this time, a cleaning process is performed in the first oxygen collection tank 2. That is, by switching the valve V1, the nitrogen adsorbed onto the adsorbent is discharged to the outside of the first oxygen collection tank 2. To achieve this, pressure of the first oxygen collection tank 2 is reduced, and a portion of the oxygen generated in the second oxygen collection tank 3 is injected into the first oxygen collection tank 2 as a purge gas by opening a portion of the valve V4, thereby allowing nitrogen to be discharged rapidly.

As described above, the related-art oxygen generator is provided with a pair of oxygen collection tanks, and continuously generates oxygen by alternately repeating the process of generating oxygen in one collection tank, while performing a cleaning process in the other collection tank.

However, the related-art oxygen generator has a disadvantage that a long time is required to supply plentiful high concentration oxygen after operating the oxygen generation device, that is, a long warming-up time is required. Right after the device is operated, oxygen of concentration of about 20% of the air is discharged from the oxygen collection tanks 2, 3, and, as time passes thereafter, the concentration of discharged oxygen gradually increases, and high concentration oxygen is discharged. In the case of the related-art oxygen generator, such a warming-up time is about several tens of minutes to one hour. Therefore, there is a problem that necessary oxygen is not plentifully used during that time.

In addition, in the case of the related-art oxygen generator, as a capacity increases, a volume and a weight of the oxygen generator greatly increase. Therefore, there are problems that the oxygen generator occupies a large installation space, and installation and maintenance are not easy.

DETAILED DESCRIPTION OF THE PRESENT DISCLOSURE

Technical Objects

An embodiment of the present disclosure provides an oxygen generator which can greatly reduce a warming-up time in comparison to a related-art device.

An embodiment of the present disclosure provides an oxygen generator which can greatly reduce a load on an oxygen collection tank in comparison to a related-art device, by reducing an amount of oxygen that should be produced by each oxygen collection tank to be supplied to an oxygen collection tank as a purge gas for a cleaning process.

In addition, an embodiment of the present disclosure provides an oxygen generator which integrates pipes installed on an upper portion and a lower portion of an oxygen collection tank assembly into a manifold or a block, thereby solving complexity of pipes, and stabilizing a supply flow and a flow velocity.

Technical Solving Means

According to an embodiment of the present disclosure, a modular oxygen generator includes: a tank assembly having a plurality of tanks coupled with one another; a lower pipe assembly disposed on a lower portion of the tank assembly, and provided with pipes to supply air to the tank assembly and to discharge nitrogen; and an upper pipe assembly disposed on an upper portion of the tank assembly, and provided with pipes to discharge oxygen generated in the tank assembly. The tank assembly includes: a plurality of beds each of which is formed of a pair of oxygen collection tanks; an air tank storing air to be supplied to the oxygen collection tanks; and an oxygen tank receiving and storing oxygen from the oxygen collection tanks. The lower pipe assembly includes: a manifold having an air supply channel and a nitrogen discharge channel formed therein, the air supply channel supplying air to the respective oxygen collection tanks from the air tank, the nitrogen discharge channel discharging nitrogen generated in the respective oxygen collection tanks to the outside; and a plurality of first valves which are provided as many as a number of the beds and are coupled to the manifold, and open and close between the pair of oxygen collection tanks of each bed, and the air supply channel and the nitrogen discharge channel.

According to an embodiment of the present disclosure, the manifold includes: first to third channels arranged in the manifold in parallel with one another; first and second upper openings formed on an upper surface of the manifold to fluidly communicate with the pair of oxygen collection tanks of each bed; and lower opening regions which are formed on a lower surface of the manifold as many as the number of the beds, and are formed of a plurality of openings. Each of the lower opening regions includes first to third lower openings fluidly communicating with the first to third channels; and fourth and fifth lower openings fluidly communicating with the first and second upper openings.

According to an embodiment of the present disclosure, the upper pipe assembly includes pipe blocks installed on the upper portion of the tank assembly as many as the number of the beds, and each of the pipe blocks includes: a lower block including first penetrating holes fluidly communicating with the pair of oxygen collection tanks of the bed, respectively, check valves installed on the first penetrating holes, and a first connection channel connecting the first penetrating holes; an upper block disposed on an upper portion of the lower block, and including a second connection channel connecting the first penetrating holes; and a second valve operating to open and close the first connection channel, and the upper blocks of the respective pipe blocks fluidly communicate with one another.

Advantageous Effect

According to an embodiment of the present disclosure, a warming-up time can be greatly reduced in comparison to a related-art device by reducing a volume of an oxygen collection tank.

According to an embodiment of the present disclosure, complexity of pipes can be solved and a supply flow and a flow velocity can be stabilized by integrating pipes installed on an upper portion and a lower portion of an oxygen collection tank assembly into a manifold or a block.

According to an embodiment of the present disclosure, there is an advantage that the total volume of an oxygen collection tank is reduced even when an amount of oxygen to be generated increases since the oxygen collection tank has a small capacity in comparison to a related-art device. In addition, a capacity of oxygen to be produced can be increased simply by connecting the plurality of modular oxygen generators of the present disclosure in parallel, and thus there is an advantage that it is easy to install and perform maintenance.

BEST MODE FOR EMBODYING THE INVENTION

Figure 1:
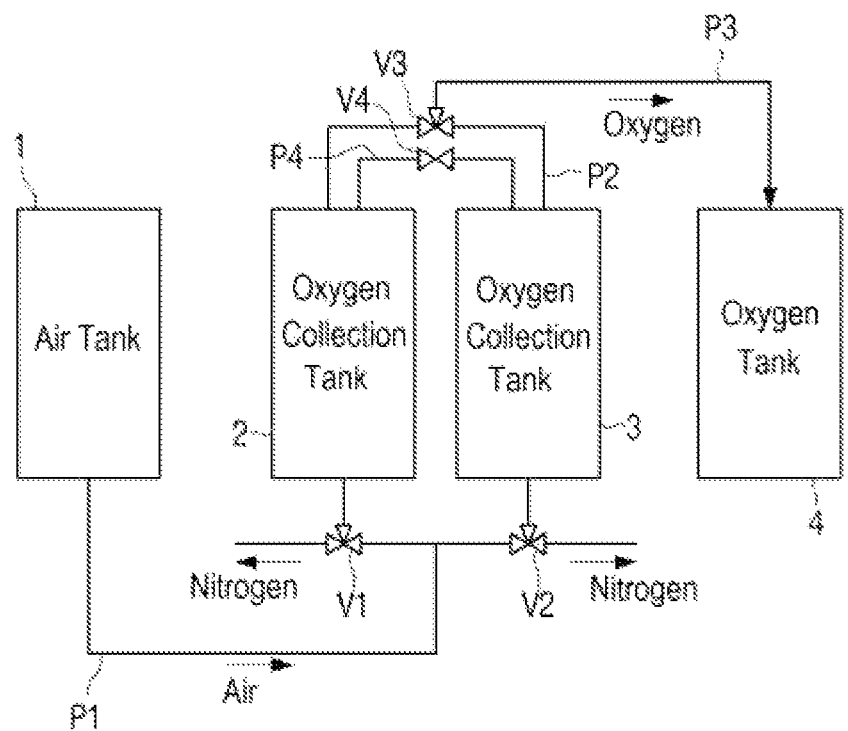
FIG. 1 is a view to illustrate a related-art oxygen generator.

The above-described objects of the present disclosure, other objects, features, and advantages will be easily understood through the accompanying drawings and preferred embodiments presented hereinbelow. Exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

It will be understood that, when an element is referred to as being "on" (or "under," "on the right of," or "on the left of") another element, the element can be directly on (or "under," "on the right of," or "on the left of") another element or intervening elements. In the drawings, thickness of elements is exaggerated for easy understanding of technical features.

The expressions such as "upper (top)," "lower (bottom)," "left," "right," "front," "rear," etc. used in the specification to explain a location relationship between elements do not mean a directions or location as an absolute criterion, and are relative expressions used for convenience of explanation with reference to a corresponding drawing when the present disclosure is explained with reference to each drawing.

If the terms such as 'first' and 'second' are used to describe elements, these elements should not be limited by such terms. These terms are only used for the purpose of distinguishing one element from another element. The exemplary embodiments include their complementary embodiments.

As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other components.

Hereinafter, the present disclosure will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the present disclosure.

Figure 2:
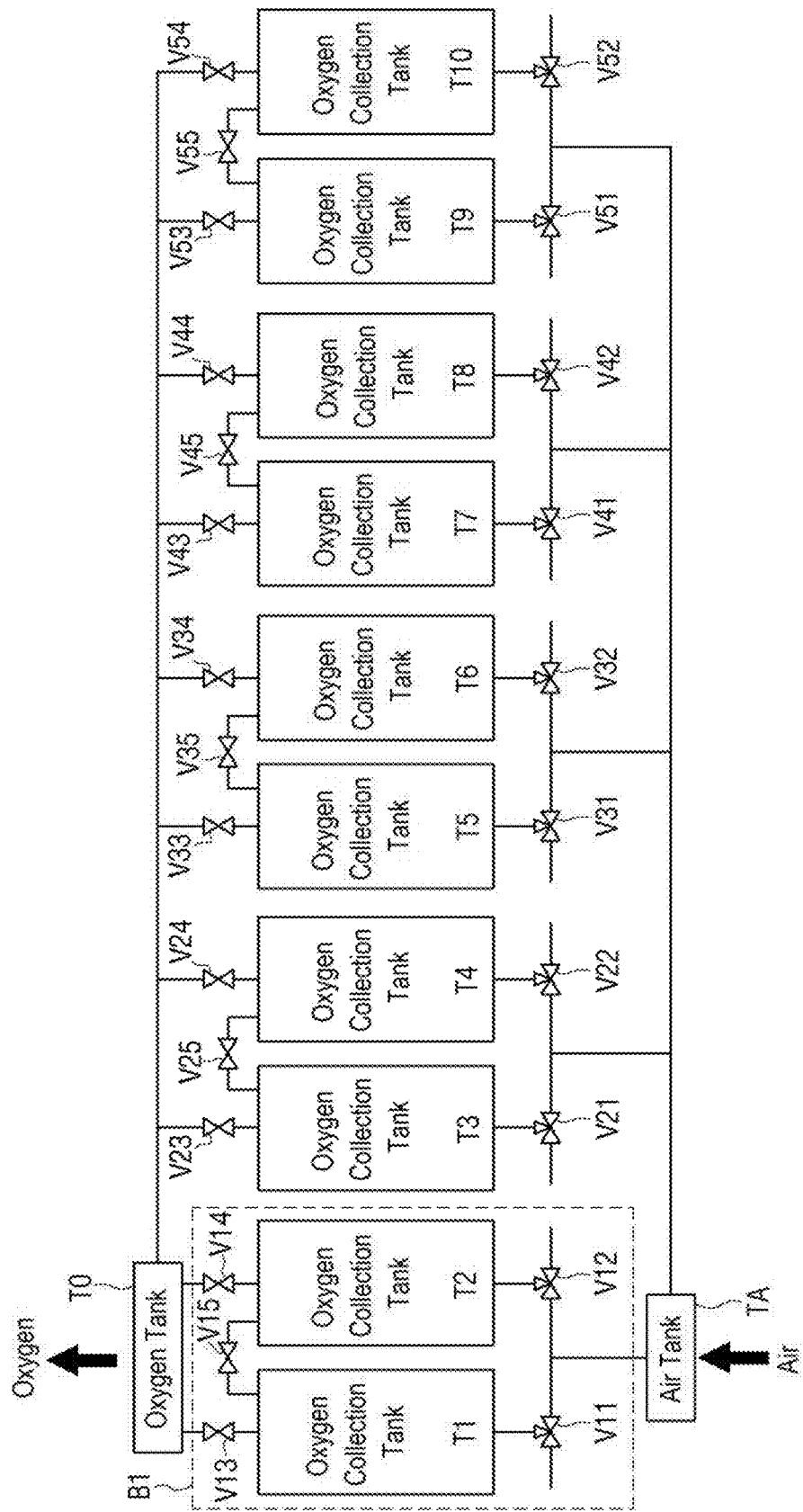
FIG. 2 is a view to illustrate a modular oxygen generator according to an embodiment of the present disclosure.

FIG. 2 is a view to illustrate a modular oxygen generator according to an embodiment of the present disclosure, and illustratively depicts only oxygen collection tanks, an air tank, an oxygen tank, and pipes and valves connecting these tanks of the oxygen generator, for convenience of explanation.

Referring to the drawing, the modular oxygen generator according to an embodiment may be implemented by connecting a plurality of beds B, each of which is formed of a pair of oxygen collection tanks. In the illustrated embodiment, a pair of oxygen collection tanks T1, T2 on the leftmost portion forms the first bed B1. Although not shown in the drawing, a pair of oxygen collection tanks T3, T4 next thereto forms the second bed, and a pair of oxygen collection tanks T5, T6 next thereto form the third bed. That is, it will be understood that the oxygen generator in the illustrated embodiment is formed of the five beds. Although the oxygen generator is formed of the five beds B in the illustrated embodiment, this is merely an exemplary embodiment, and the number of beds may vary according to a real embodiment.

In explaining with reference to the first bed B1 of the modular oxygen generator illustrated, the bed B1 is formed of the first oxygen collection tank T1 and the second oxygen collection tank T2, and the modular oxygen generator includes a plurality of pipes and a plurality of valves connecting between the bed B1 and the air tank TA and the oxygen tank TO.

The air tank TA stores air to be supplied to the oxygen collection tanks T1, T2, and supplies the air to the oxygen collection tanks T1, T2 when necessary. The first and second oxygen collection tanks T1, T2 are alternately supplied with the air from the air tank TA, and generates oxygen by separating oxygen from the air. In an embodiment, each of the oxygen collection tanks T1, T2 is filled with a nitrogen adsorbent such as Zeolite, and, when the air passes through the oxygen collection tanks T1, T2, a nitrogen component is adsorbed onto the adsorbent, and oxygen is generated by being separated.

Pipes are connected to supply the air to the oxygen collection tanks T1, T2 from the air tank T, and valves V11, V12 are arranged to control a fluid flow. The first supply valve V11 controls opening and closing of the pipe between the air tank TA and the first oxygen collection tank T1, and the second supply valve V12 controls opening and closing of the pipe between the air tank TA and the second oxygen collection tank T2.

When air supply from the air tank TA is stopped, the oxygen collection tanks T1, T2 may discharge nitrogen to the outside. For example, when the first oxygen collection tank T1 is cleaned, the valve V11 may be switched to allow nitrogen in the first oxygen collection tank T1 to be discharged to the outside, and simultaneously, the valve V12 may be switched to allow the air to flow into the second oxygen collection tank T2.

The oxygen generated in each of the oxygen collection tanks T1, T2 is discharged to the oxygen tank TO. For example, when the first oxygen collection tank T1 collects oxygen and the second oxygen collection tank T2 is cleaned, a first discharge valve V13 is opened and a second discharge valve V14 is closed. Accordingly, oxygen generated in the first oxygen collection tank T1 passes through the first discharge valve V13 and is supplied to the oxygen tank TO, and at this time, nitrogen in the second oxygen collection tank T2 is discharged to the outside through the first supply valve V12.

In this case, a portion of the oxygen in the first oxygen collection tank T1 may be supplied to the second oxygen collection tank T2 to function as a purging gas, by opening at least a portion of a valve V15 installed on a bypass path connecting the two oxygen collection tanks T1, T2.

In an embodiment, the oxygen generator includes a plurality of beds B which are the same as or similar to the above-described first bed B1. Preferably, the oxygen generator is configured by connecting the plurality of beds B in parallel. That is, the oxygen collection tanks T1 to T10 of the respective beds B are connected with the air tank TA and the oxygen tank TO, respectively.

In this configuration, the first oxygen collection tank and the second oxygen collection tank of each bed B alternately perform an oxygen collection operation and a cleaning operation, and there may be a slight time gap in operation between the plurality of beds B. For example, when the oxygen collection and the cleaning operation are switched between the first and second oxygen collection tanks T1, T2 of the first bed B1, the first oxygen collection tanks T3, T5, T7, T9 in the second to fifth beds B2 to B5 perform oxygen collection operations, and, when the oxygen collection and the cleaning operation are switched between the first and second oxygen collection tanks T3, T4 of the second bed B2, the first oxygen collection tanks T1, T5, T7, T9 in the first and third to fifth beds B1, B3-B5 perform oxygen collection operations. In this way, when operations are switched between the first and second oxygen collection tanks in one bed, the first or second oxygen collection tanks in the other beds perform oxygen collection operations.

As in the embodiment described above, by configuring the modular oxygen generator by connecting the plurality of beds, each of which is provided with a pair of oxygen collection tanks, the volume of the device can be noticeably reduced in comparison to a related-art oxygen generator. For example, when a modular oxygen generator of 5 $Nm^3/h$ is configured by connecting five beds (B) each having a capacity of 1 $Nm^3/h$, the volume of the device can be reduced by $1/10$ in comparison to the related-art oxygen generator of 5 $Nm^3/h$ having only one pair of oxygen collection tanks as shown in FIG. 1, and, by reducing the volume of the oxygen collection tank, a warming-up time can be greatly reduced in comparison to the related-art device.

In addition, in the case of FIG. 1, when operations are switched between the first and second oxygen collection tanks 2, 3, for example, when air supply to the first oxygen collection tank 2 is stopped and air supply to the second oxygen collection tank 3 starts, an amount of generated oxygen is temporarily reduced or oxygen generation is stopped. Therefore, pressure measured in the oxygen tank is abruptly reduced and then increases. However, according to an embodiment of the present disclosure, there are provided the plurality of beds B, and, when operations are switched between the first and second oxygen collection tanks in one bed, the first or second oxygen collection tanks in the other beds perform oxygen collection operations. That is, since an operation switch is made only in one bed at a certain time, the pressure in the oxygen tank is not greatly changed, and oxygen can be continuously and stably supplied.

Figure 3:
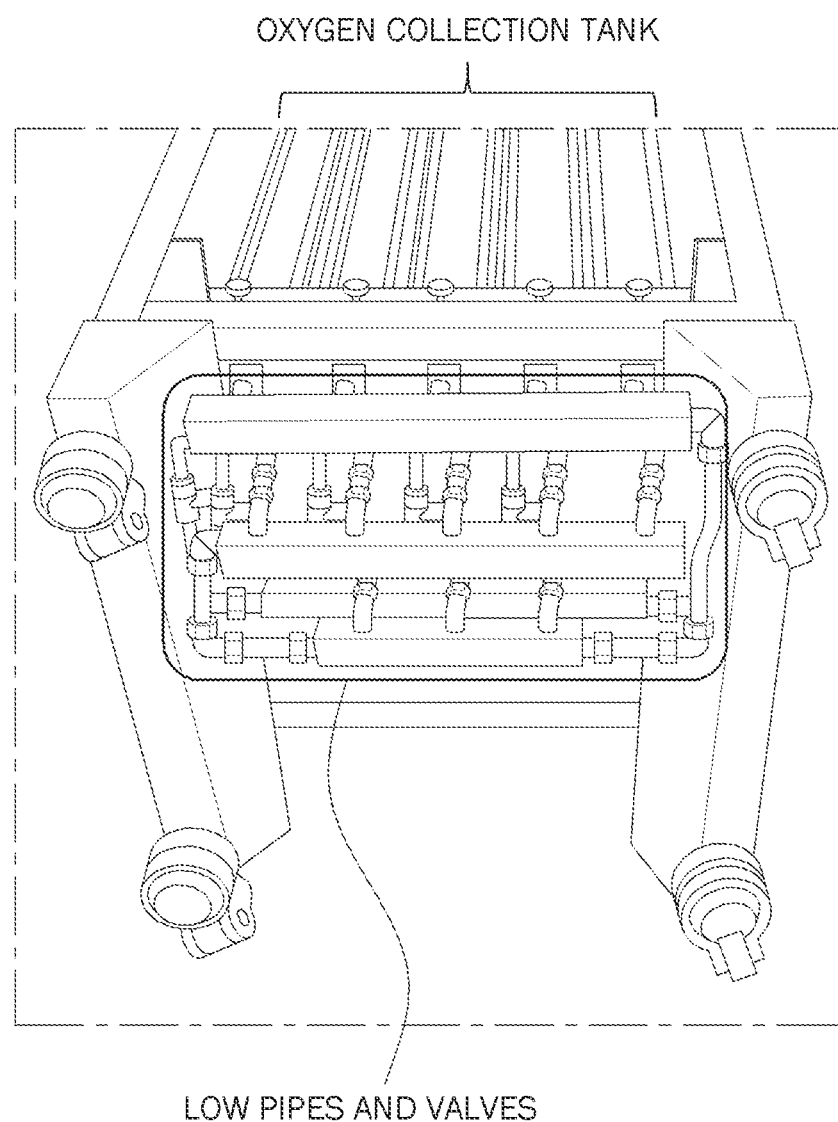
FIG. 3 is a view to illustrate a lower structure of the modular oxygen generator of the present disclosure.

FIG. 3 illustrates a lower structure of a trial product made by implementing the oxygen generator of FIG. 2 described above. The illustrated product includes 10 oxygen collection tanks T1 to T10 which are arranged in a 5*2 array, and has a plurality of valves and a plurality of pipes installed on upper portions and lower portions of the oxygen collection tanks.

As described above with reference to FIG. 2, the oxygen generator of the present disclosure has advantages that the total volume of the device can be greatly reduced, and oxygen can be continuously and stably generated. However, many valves and pipes should be connected and installed on upper portions and lower portions of the oxygen collection tanks T1 to T10. For example, since one valve V11 to V52 is required for one tank under the oxygen collection tanks, and three pipes are connected for every valve, at least 10 valves and at least 30 pipes should be connected under the oxygen collection tanks T1 to T10.

Accordingly, as shown in FIG. 3, the volumes of the oxygen collection tanks T1 to T10 are reduced, but a large number of valves and pipes are installed thereunder, and thus there are problems that the device is complicated and it is difficult to perform maintenance.

FIGS. 4 to 17 illustrate a modular oxygen generator which can solve these problems according to a preferred embodiment.

Figure 4:
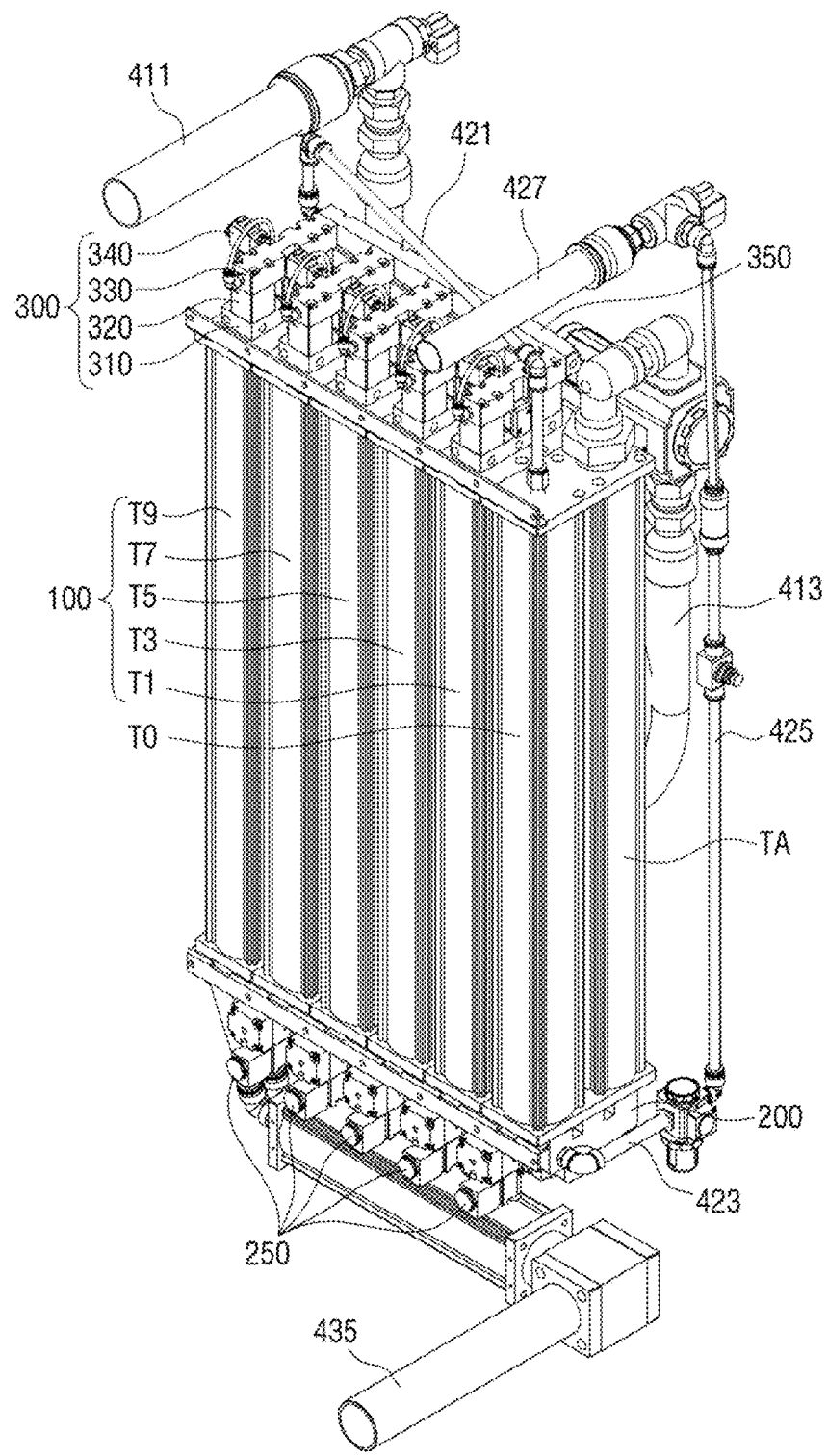
FIG. 4 is a perspective view of a modular oxygen generator according to an embodiment.
Figure 5:
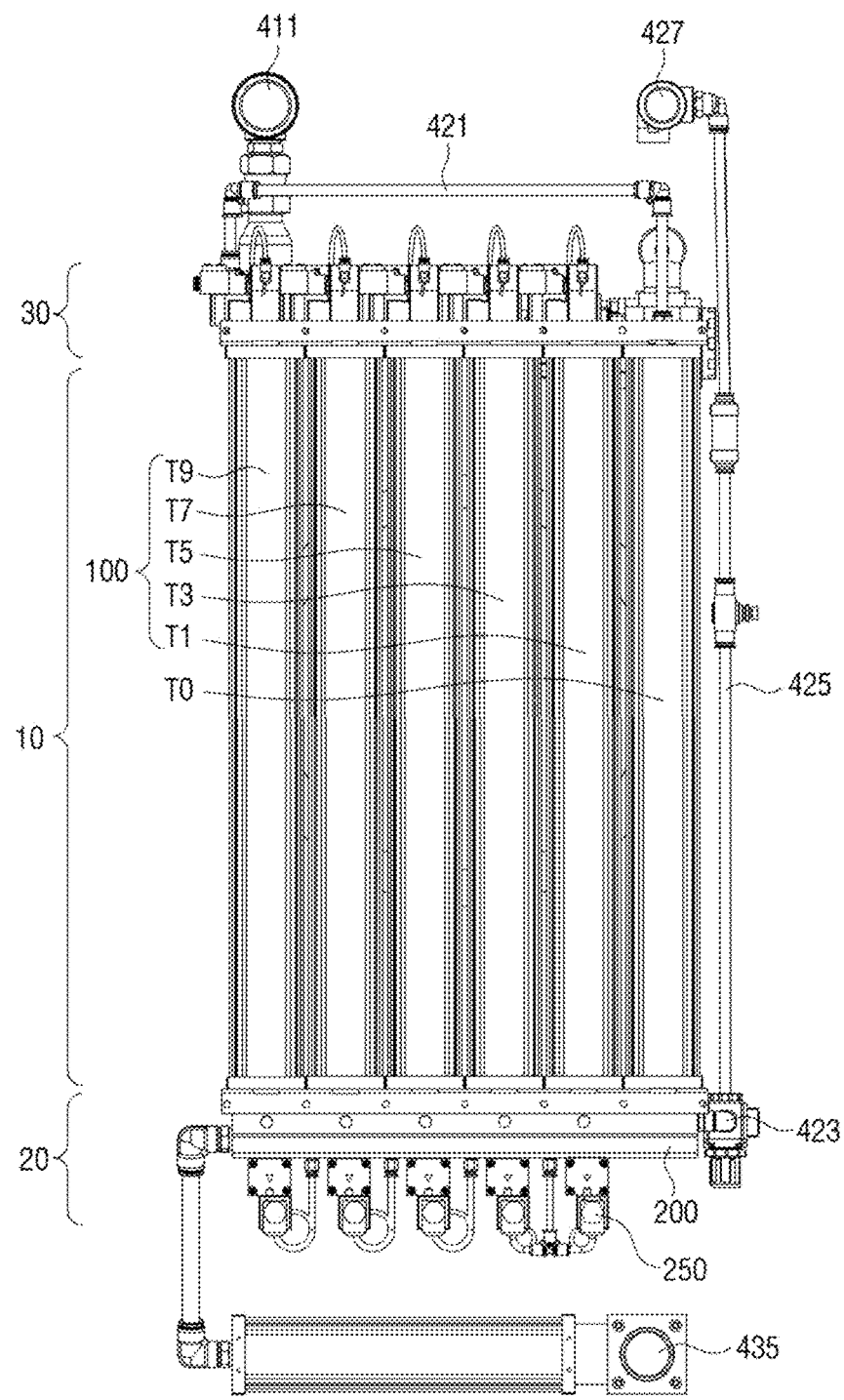
FIG. 5 is a front view of the modular oxygen generator according to an embodiment.
Figure 6:
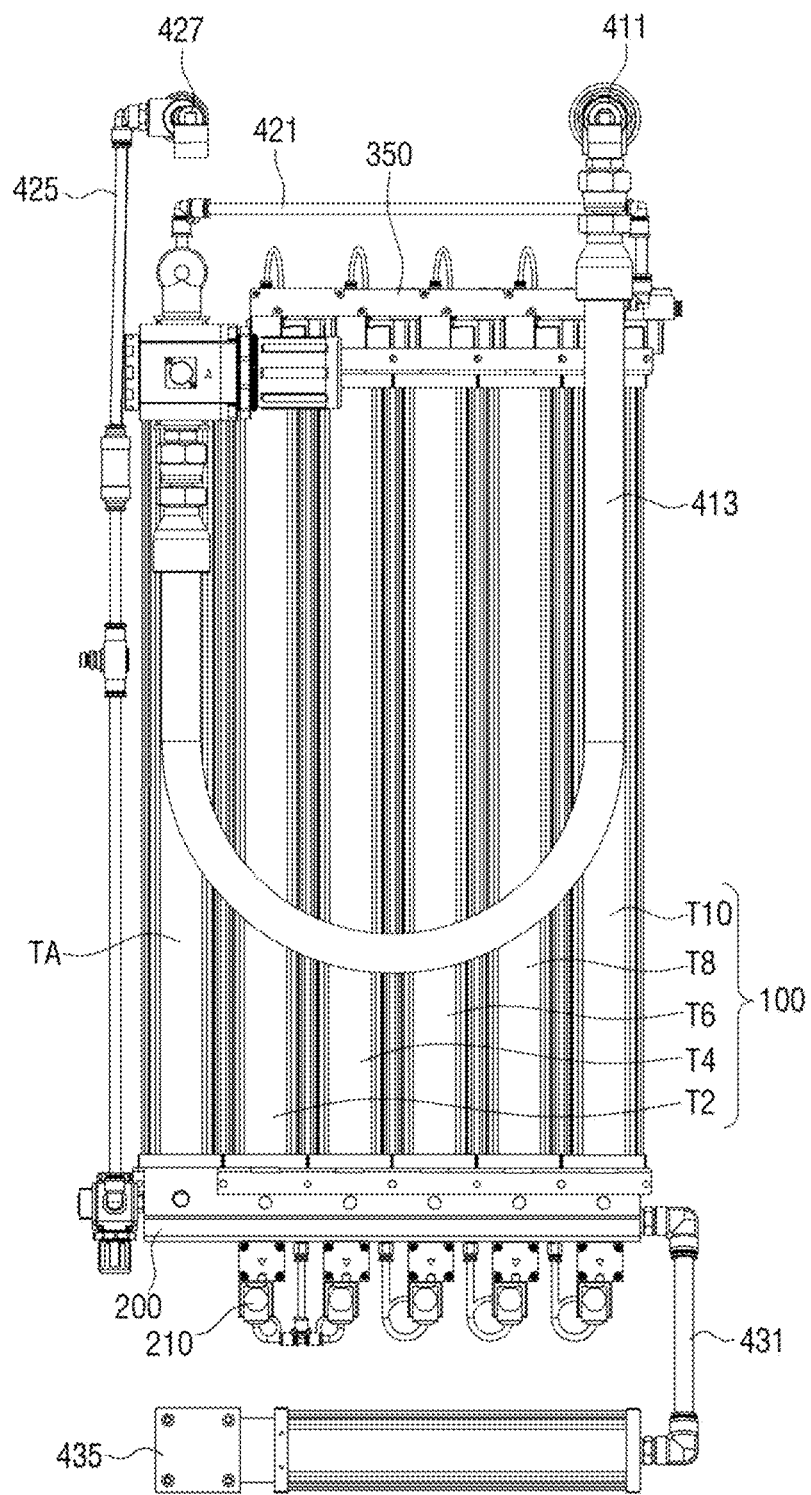
FIG. 6 is a rear view of the modular oxygen generator according to an embodiment.
Figure 7:
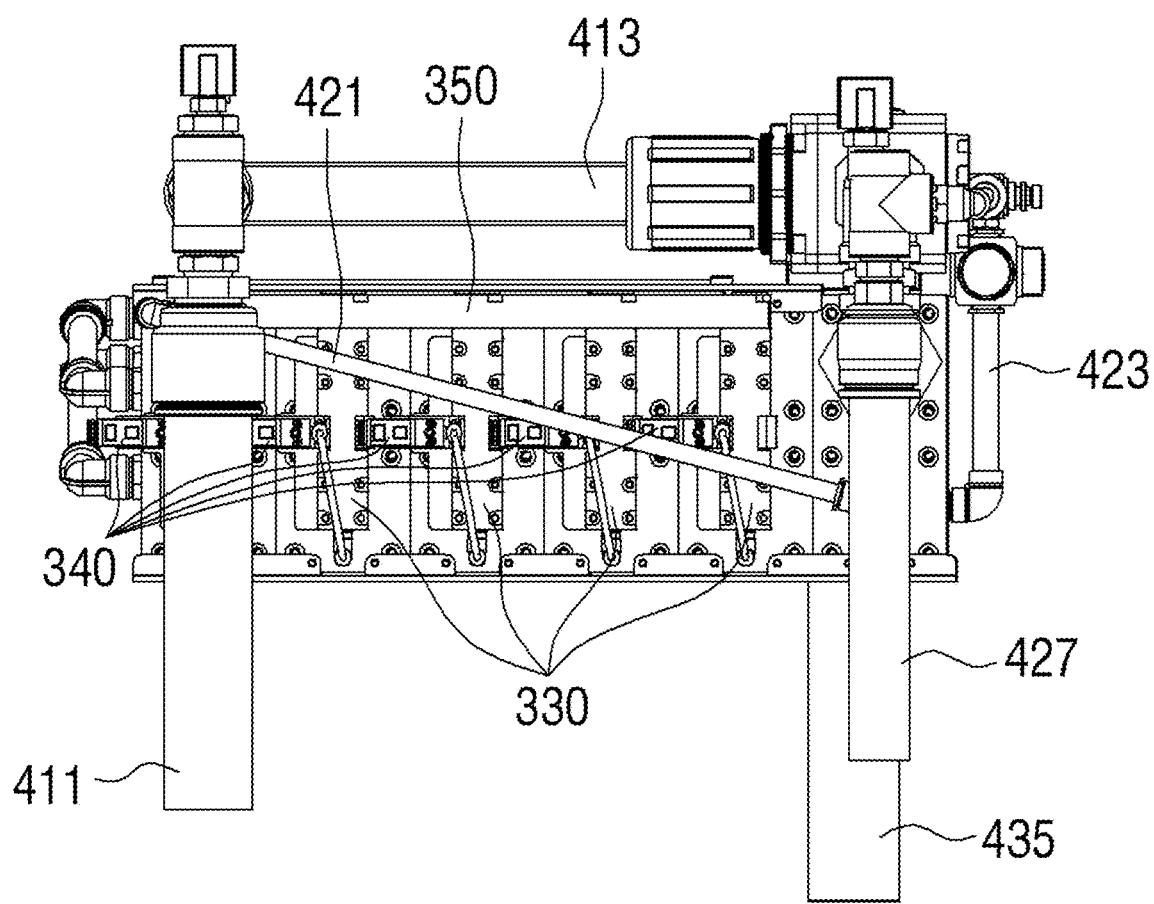
FIG. 7 is a top view of the modular oxygen generator according to an embodiment.
Figure 8:
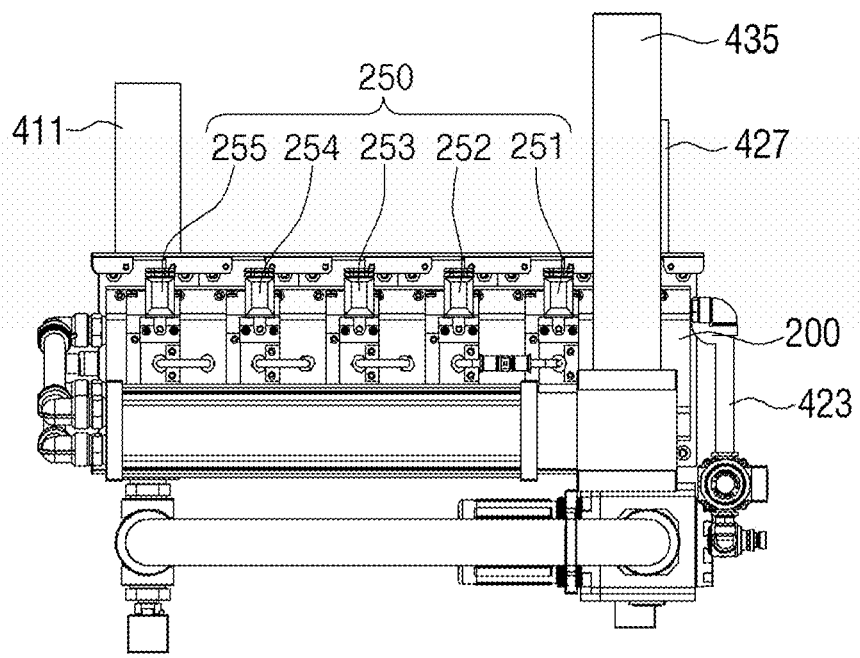
FIG. 8 is a bottom view of the modular oxygen generator according to an embodiment.

FIG. 4 is a perspective view of a modular oxygen generator according to a preferred embodiment, and FIGS. 5 to 8 are a front view, a rear view, a top view, and a bottom view illustrating the modular oxygen generator, respectively.

Referring to the drawings, the modular oxygen generator according to an embodiment includes a tank assembly 10, a lower pipe assembly 20 disposed on a lower portion of the tank assembly 10, and an upper pipe assembly 30 disposed on an upper portion of the tank assembly 10.

The tank assembly 10 may include a plurality of oxygen collection tanks 100, a single air tank TA, and a single oxygen tank TO. In the illustrated example, 10 oxygen collection tanks 100 in total are arranged in a 5*2 array by connecting five beds, each of which is formed of a pair of oxygen collection tanks. However, the number of beds may vary according to a specific embodiment.

In the illustrated embodiment, the first bed includes the first oxygen collection tank T1 and the second oxygen collection tank T2, the second bed includes the third oxygen collection tank T3 and the fourth oxygen collection tank T4, the third bed includes the fifth oxygen collection tank T5 and the sixth oxygen collection tank T6, the fourth bed includes the seventh oxygen collection tank T7 and the eighth oxygen collection tank T8, and the fifth bed includes the ninth oxygen collection tank T9 and the tenth oxygen collection tank T10.

The lower pipe assembly 20 is disposed on the lower portion of the tank assembly 10, and includes channels and valves to supply air to the tank assembly 10 and to discharge nitrogen. In an embodiment, the lower pipe assembly 20 may include a manifold 200 which has a plurality of channels formed therein, and a plurality of valves 250 attached to a lower surface of the manifold 200. The lower pipe assembly 20 will be described in detail below with reference to FIGS. 10 to 15.

The upper pipe assembly 30 is disposed on the upper portion of the tank assembly 10, and includes channels and valves to discharge oxygen generated in the tank assembly 10. In an embodiment, the upper pipe assembly 30 may include pipe blocks 300 installed on the upper portion of the tank assembly 10 as many as the number of beds. Each of the pipe blocks 300 may include a lower block 310, intermediate blocks 320, an upper block 330, and a valve 340, each of which has one or more channels formed therein. In addition, the plurality of pipe blocks 300 may be connected with one another by a single connection block 350. The upper pipe assembly 30 will be described in detail below with reference to FIGS. 16 and 17.

In the illustrated embodiment, external air is supplied to the modular oxygen generator via an air inlet 411. The air supplied to the air inlet 411 passes through a U-shaped pipe 413 and is supplied to the upper portion of the air tank TA. The air stored in the air tank TA is distributed in the manifold 200 of the lower pipe assembly 20, and is supplied to the respective oxygen collection tanks 100.

Oxygen generated in the oxygen collection tanks 100 is supplied to the oxygen tank TO through the connection block 350 of the upper pipe assembly 30 and an oxygen conveyance pipe 421 connected therewith. Oxygen collected in the oxygen tank TO may be supplied to the outside through discharge pipes 423, 425, 427.

On the other hand, nitrogen discharged from the oxygen collection tanks 100 due to a cleaning operation of the oxygen collection tanks 100 may be collected in the manifold 200 of the lower pipe assembly 30, and may be discharged to the outside through discharge pipes 431, 435.

Figure 9:
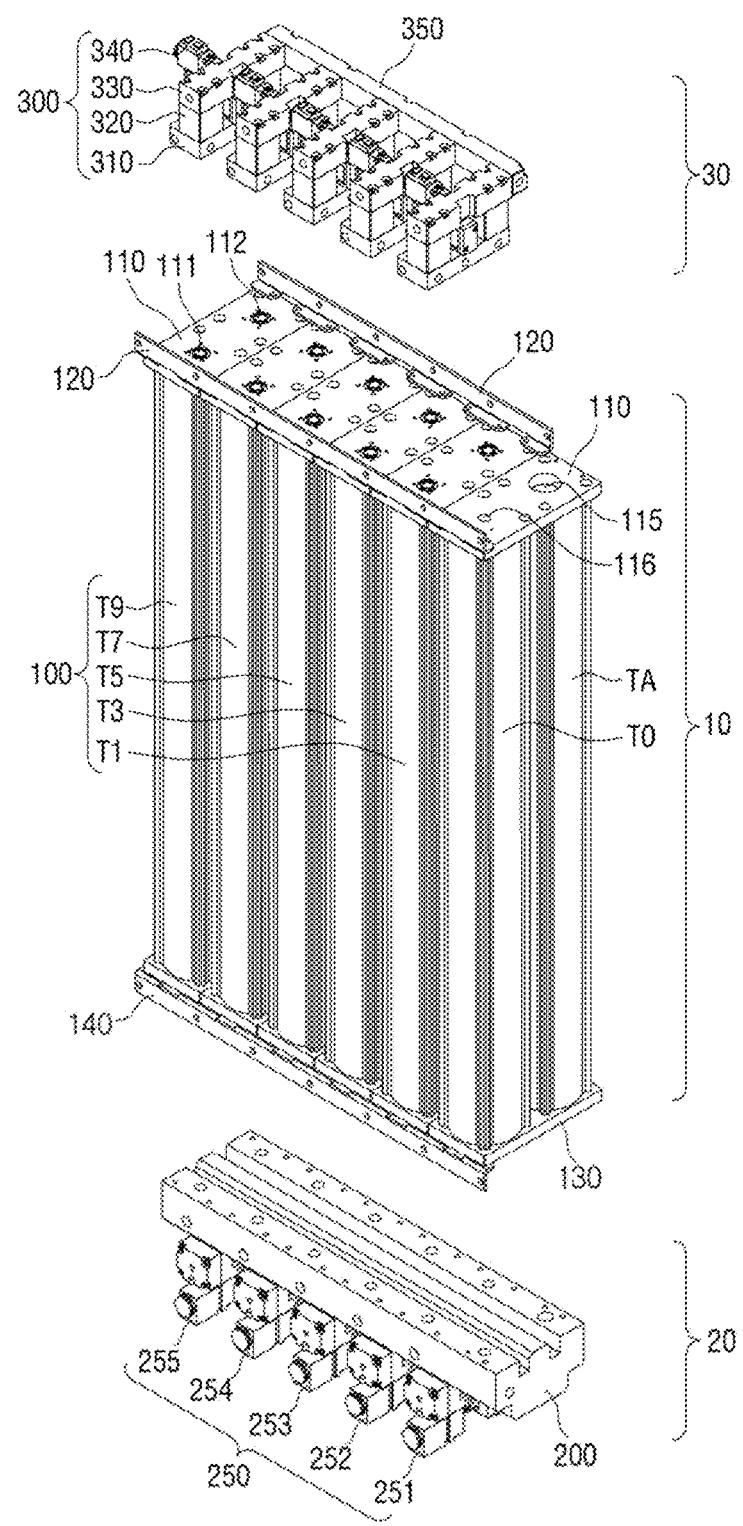
FIG. 9 is an exploded perspective view of the modular oxygen generator according to an embodiment.

FIG. 9 is an exploded perspective view of the modular oxygen generator according to an embodiment, and illustrates the tank assembly 10, the lower pipe assembly 20, and the upper pipe assembly 30 in an exploded state, and omits inflow and discharge pipes 411, 413, 423, 425, 427, 431, 435 for air, oxygen, and nitrogen for convenience of explanation.

As described above, the tank assembly 10 includes the five beds, and each bed is formed of a pair of oxygen collection tanks (T1, T2; T3, T4; T5, T6; T7, T8; T9, T10). In each bed, the pair of oxygen collection tanks are fastened to an upper connection plate 110 and a lower connection plate 130, and are integrally coupled thereto, and the plurality of beds are fastened to an upper connection frame 120 connecting the upper connection plates 110, and a lower connection frame 140 connecting the lower connection plates 130, such that the entire beds are integrally coupled to one another.

Each of the upper connection plates 110 coupled to upper portions of the oxygen collection tanks includes penetrating holes 111, 112 to allow the oxygen collection tanks and the upper pipe assembly 30 to fluidly communicate with each other, and the upper connection plate 110 coupled to the air tank TA and the oxygen tank TO includes penetrating holes 115, 116.

Likewise, each of the lower connection plates 130 coupled to lower portions of the oxygen collection tanks includes penetrating holes to allow the oxygen collection tanks and the lower pipe assembly 20 to fluidly communicate with each other, although not shown in the drawings, and the lower connection plate 130 coupled to the air tank TA and the oxygen tank TA includes penetrating holes.

Figure 10:
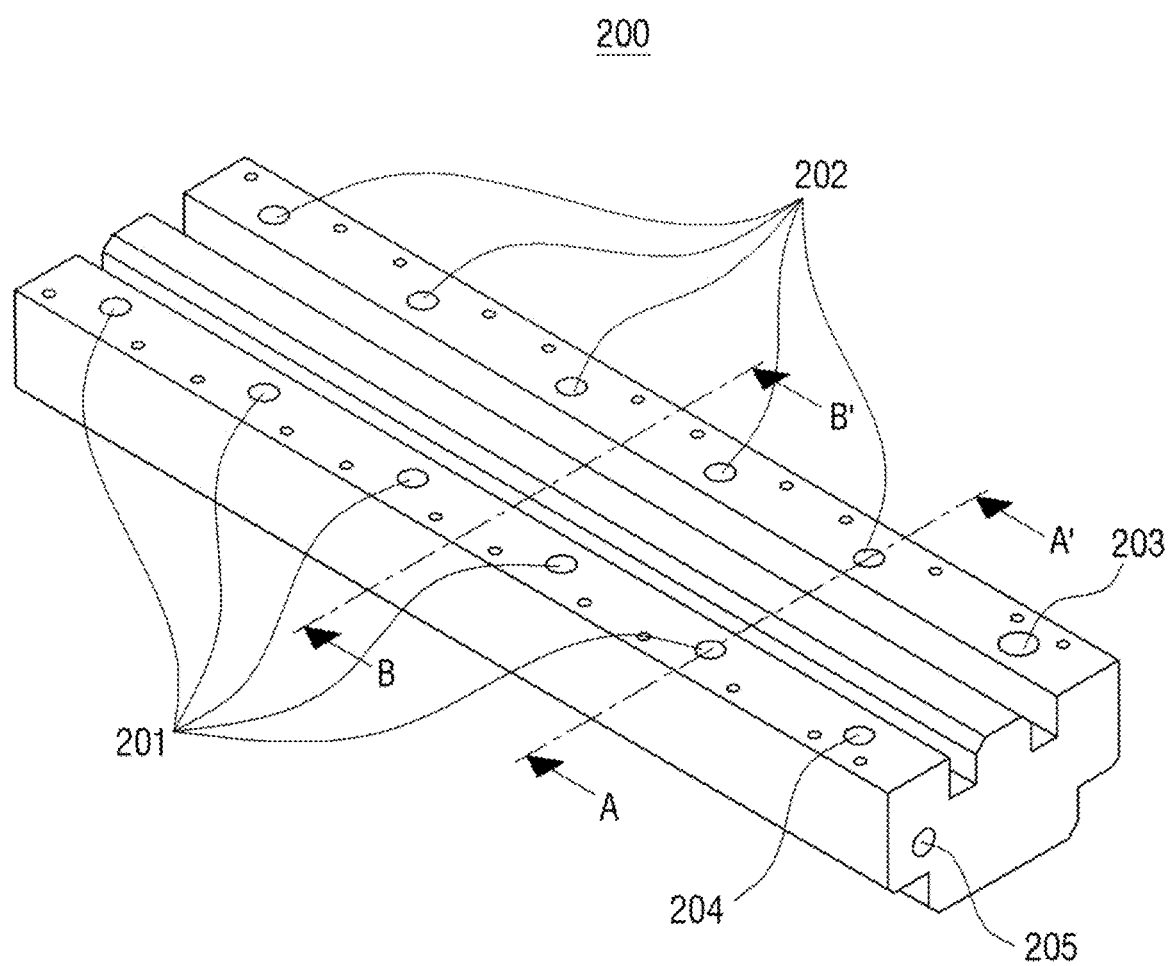
FIG. 10 is a perspective view of a manifold of a lower pipe assembly of the modular oxygen generator according to an embodiment.
Figure 11:
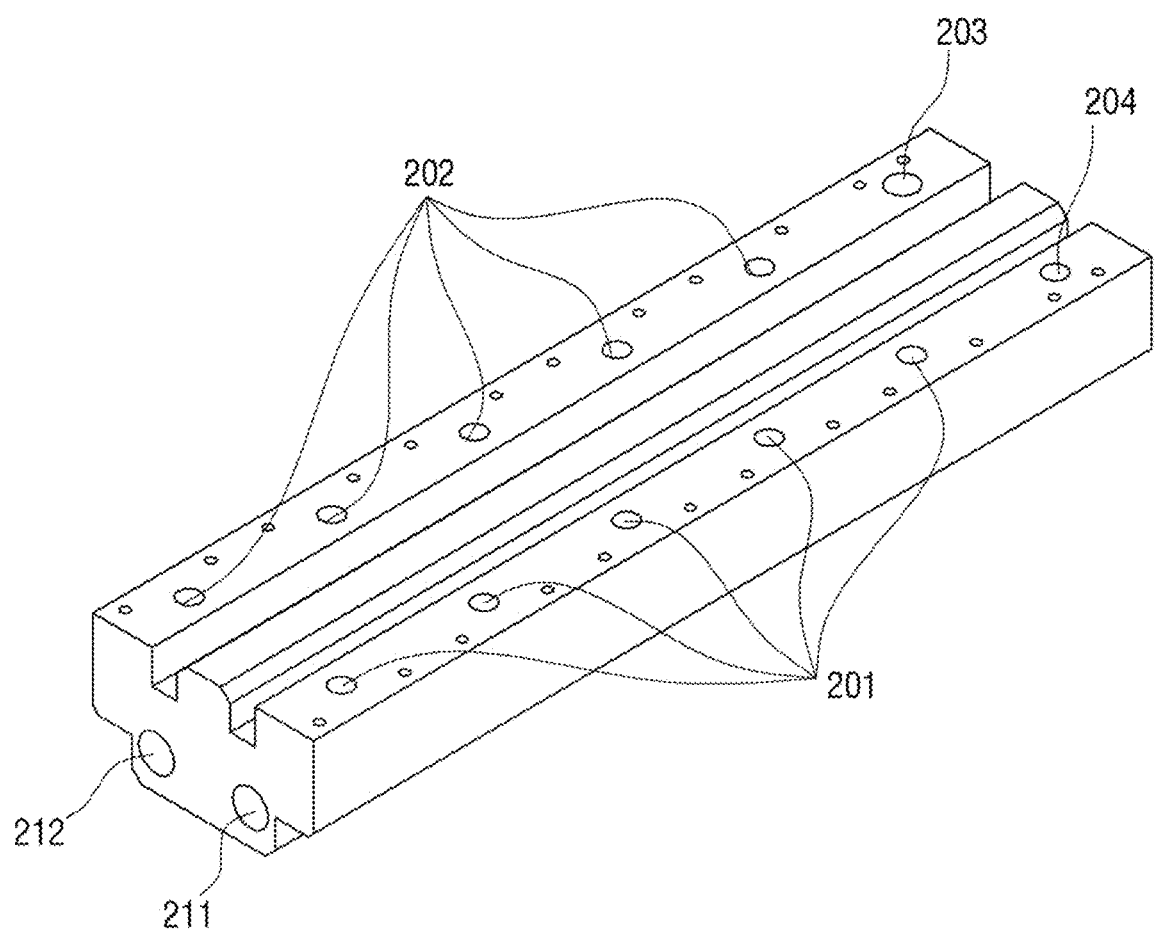
FIG. 11 is a perspective view of the manifold according to an embodiment from a different viewpoint.
Figure 12:
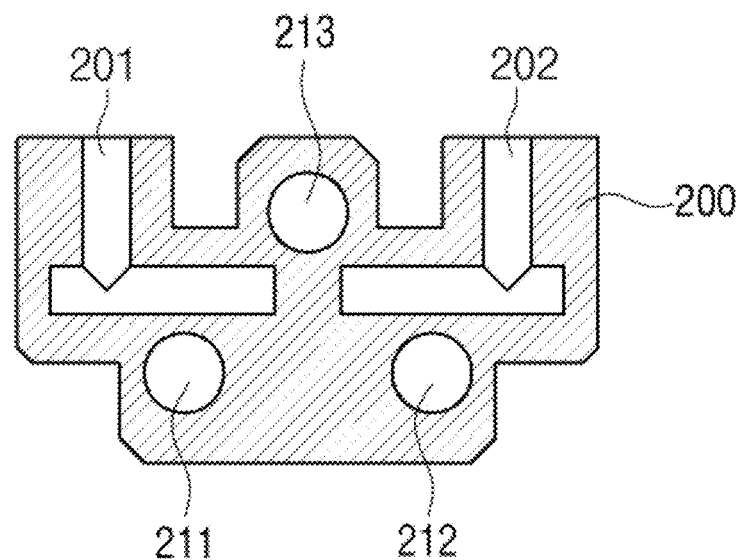
FIG. 12 is a cross-sectional view taken on line A-A' of FIG. 10.
Figure 13:
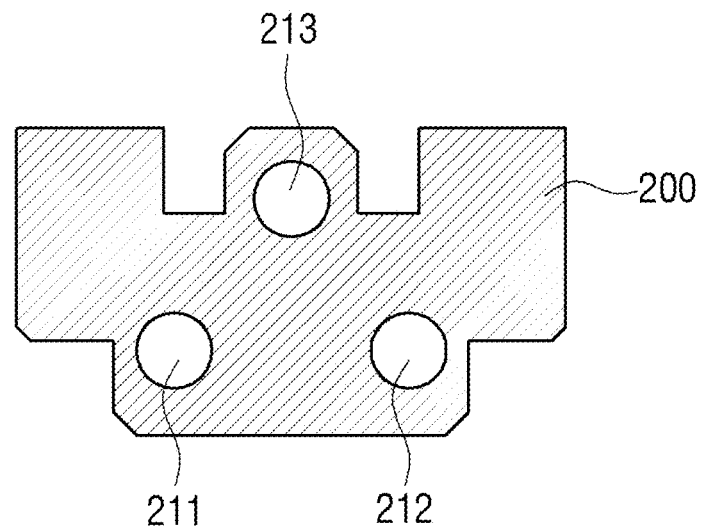
FIG. 13 is a cross-sectional view taken on line B-B' of FIG. 10.

Hereinafter, an exemplary structure of the manifold 200 of the lower pipe assembly 20 will be described with reference to FIGS. 10 to 13. FIGS. 10 and 11 are perspective views of the manifold 200 of the lower pipe assembly 20 from different viewpoints, FIG. 12 is a cross-sectional view take on line A-A' of FIG. 10, and FIG. 13 is a cross-sectional view taken on line B-B' of FIG. 10.

Referring to the drawings, the manifold 200 according to an embodiment has a long block shape. The manifold 200 includes three channels arranged therein in a lengthwise direction in parallel with one another, that is, first to third channels 211, 212, 213. In an embodiment, the first and second channels 211, 212 function as nitrogen discharge channels to collect nitrogen discharged from the oxygen collection tanks 100 and to discharge the nitrogen to the outside, and the third channel 213 functions as an air supply channel to supply air to the oxygen collection tanks 100.

As shown in FIGS. 10 and 11, the manifold 200 has a plurality of openings 201, 202, 203, 204 formed on an upper surface thereof. The first and second openings 201, 202 are formed to fluidly communicate with the pair of oxygen collection tanks of each bed of the tank assembly 10, and are formed at positions aligned with the oxygen collection tanks 100.

Since the 10 oxygen collection tanks are provided in the illustrated embodiment, 10 openings 201, 202 are formed on the upper surface of the manifold 200. For example, the five first openings 201 are connected with the first oxygen collection tanks T1, T3, T5, T7, T9 of the first to fifth beds, respectively, and the five second openings 202 are connected with the second oxygen collection tanks T2, T4, T6, T8, T10 of the first to fifth beds, respectively.

The third opening 203 formed on the upper surface of the manifold 200 fluidly communicates with the air tank TA, and is formed at a position aligned with the air tank TA. In an embodiment, the third opening 203 and the third channel 213 are configured to fluidly communicate with each other inside the manifold 200.

The fourth opening 204 formed on the upper surface of the manifold 200 fluidly communicates with the oxygen tank TO, and is formed at a position aligned with the oxygen tank TO. As shown in FIG. 10, a side surface opening 205 is formed on a side surface of the manifold 200 adjacent to the fourth opening 204, and the fourth opening 204 and the side surface opening 205 are configured to fluidly communicate with each other inside the manifold 200. That is, oxygen discharged from the oxygen tank TO flows into the manifold 200 through the fourth opening 204, and then is discharged to the outside through the side surface opening 205.

Figure 14:
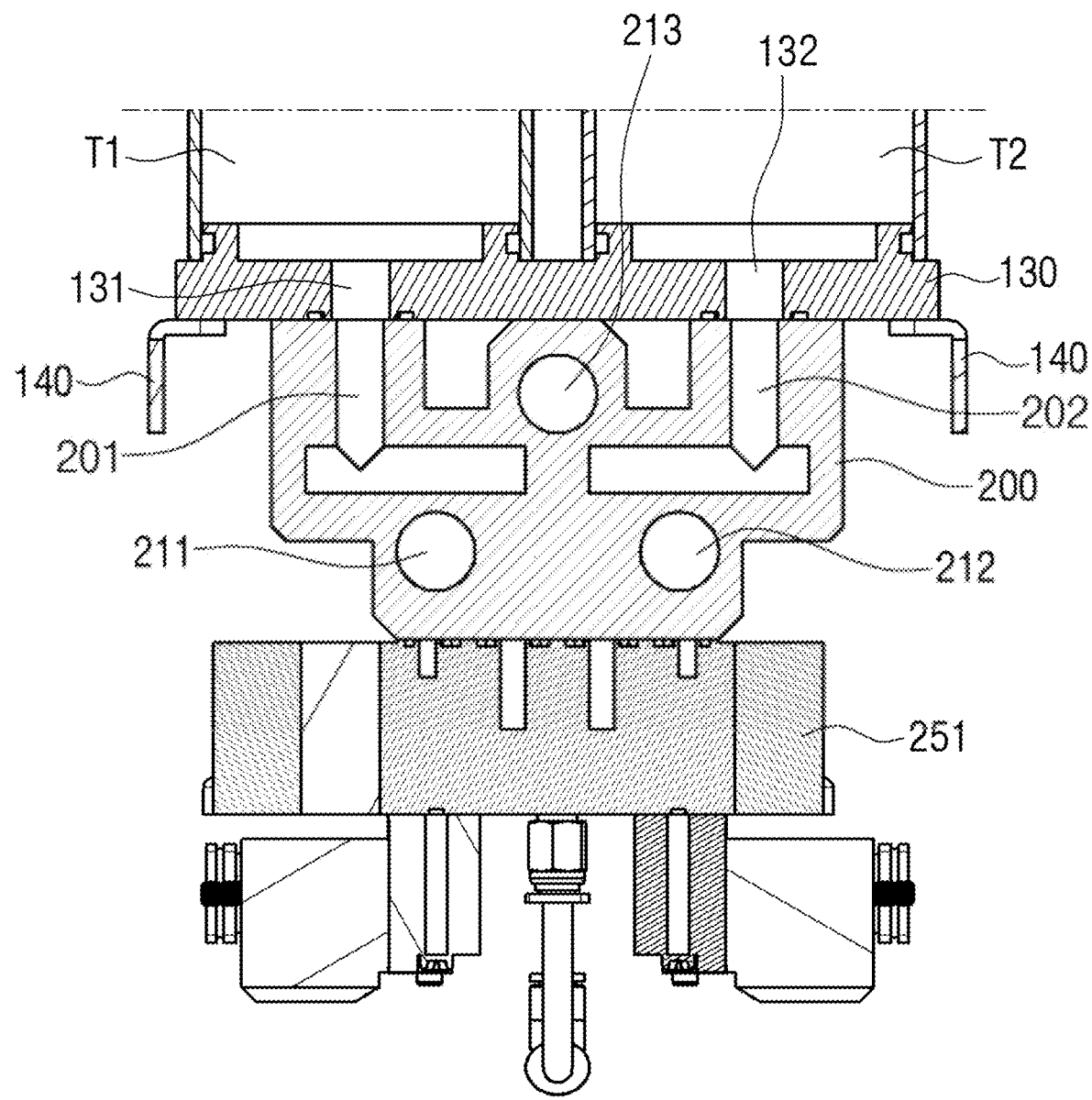
FIG. 14 is a view to illustrate an operation of the lower pipe assembly according to an embodiment.

From now on, an operation of the lower pipe assembly 20 will be described with reference to FIG. 14. FIG. 14 is a cross-sectional view illustrating the lower portion of the first bed formed of the pair of oxygen collection tanks T1, T2, and the lower pipe assembly 20 coupled thereunder.

Referring to the drawing, the manifold 200 is attached to the lower portion of the lower connection plate 130 connecting the pair of oxygen collection tanks T1, T2. The first oxygen tank T1 fluidly communicates with the first opening 201 on the upper surface of the manifold 200 through the first penetrating hole 131 of the lower connection plate 130. The second oxygen collection tank T2 fluidly communicates with the second opening 202 on the upper surface of the manifold 200 through the second penetrating hole 132 of the lower connection plate 130.

A valve 251 is attached to a lower surface of the manifold 200. The valve may use a solenoid valve, for example, but is not limited thereto. In addition, specific elements such as an electric wire to control the valve are not illustrated. The valve 251 operates to connect or close the first and second openings 201, 202 and the first to third channels 211, 212, 213.

In an embodiment, when the first oxygen collection tank T1 generates oxygen and the second oxygen collection tank T2 performs a cleaning operation, the first opening 201 and the third channel 213 fluidly communicates with each other, and the second opening 202 and the second channel 212 fluidly communicates with each other by an operation of the valve 251. Accordingly, the air stored in the air tank TA is supplied to the first oxygen collection tank T1, and nitrogen discharged from the second oxygen collection tank T2 is discharged to the outside through the discharge pipe 431.

When the first oxygen collection tank T1 performs a cleaning operation and the second oxygen collection tank T2 generates oxygen, the first opening 201 and the first channel 211 fluidly communicates with each other, and the second opening 202 and the third channel 213 fluidly communicates with each other by an operation of the valve 251. Accordingly, the air stored in the air tank TA is supplied to the second oxygen collection tank T2, and nitrogen discharged from the first oxygen collection tank T1 is discharged to the outside through the discharge pipe 431.

Additional penetrating holes or opening may be formed in the manifold 200 to connect or close the first and second openings 201, 202 and the first to third channels 211, 212, 213 by the operation of the valve 251 described above.

Figure 15:
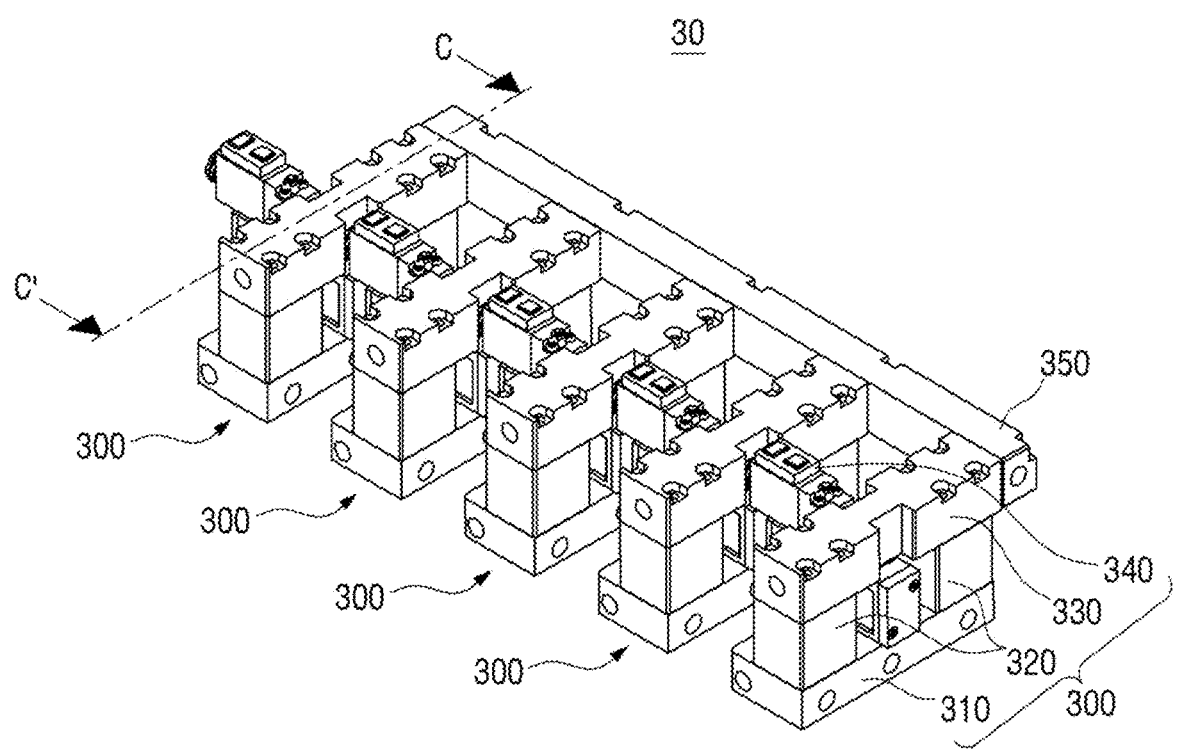
FIG. 15 is a perspective view of an upper pipe assembly of the modular oxygen generator according to an embodiment.
Figure 16:
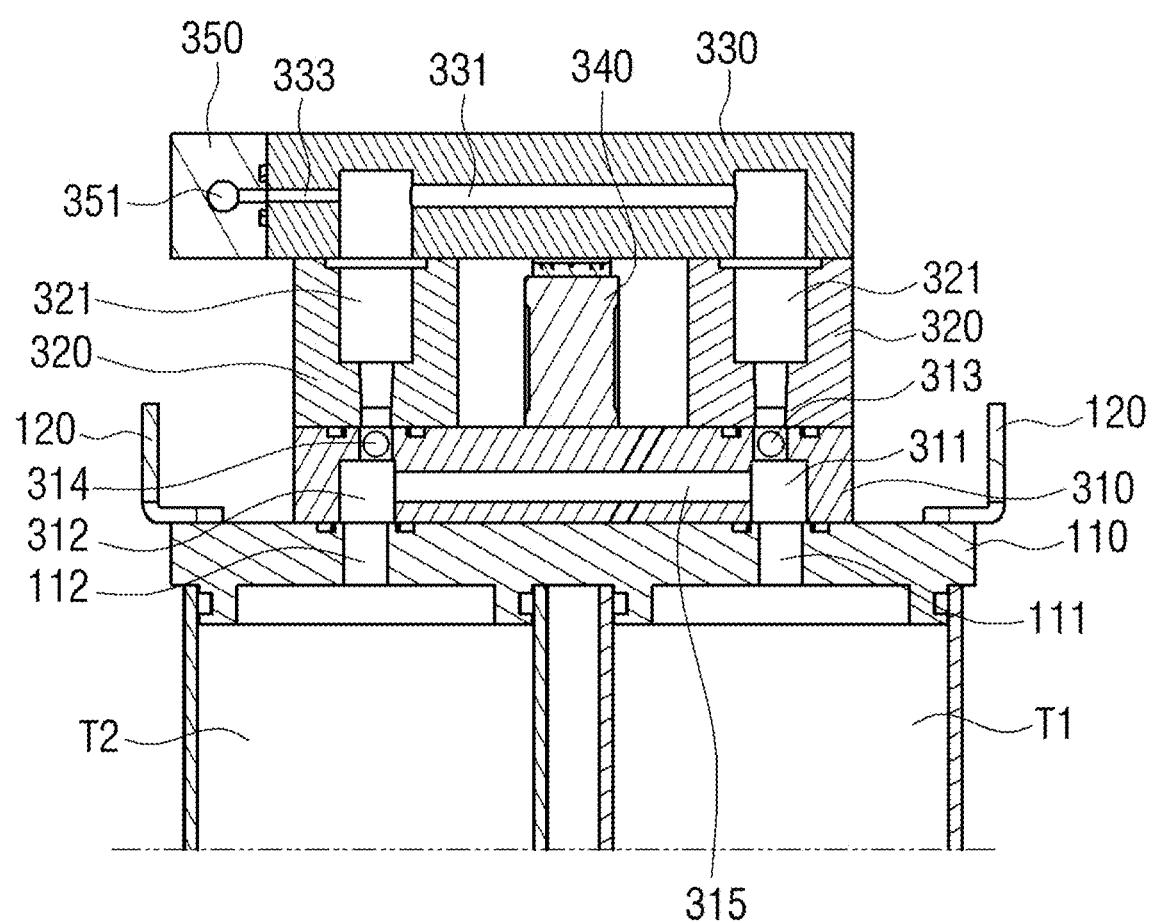
FIG. 16 is a cross-sectional view taken on line C-C' of FIG. 15.

Hereinafter, an exemplary structure of the upper pipe assembly 30 will be described with reference to FIGS. 15 and 16. FIG. 15 is a perspective view illustrating the upper pipe assembly 30 according to an embodiment, and FIG. 16 is a cross-sectional view taken on line C-C' of FIG. 15. In FIG. 16, a portion of the upper portion of the first bed formed of the pair of oxygen collection tanks T1, T2 is illustrated for convenience of explanation.

Referring to the drawings, the upper pipe assembly 30 according to an embodiment includes as many pipe blocks 300 as the number of beds of the tank assembly 10. Each of the pipe blocks 300 may include the lower block 310, the intermediate block 320, the upper block 330, and the valve 340. The plurality of pipe blocks 300 may be connected with one another by the single connection block 350.

The lower block 310 may include penetrating holes 311, 312 fluidly communicating with the pair of oxygen collection tanks T1, T2 of the bed, respectively, check valves 313, 314 installed on the penetrating holes 311, 312, and a connection channel 315 connecting the penetrating holes 311, 312.

The intermediate block 320 is interposed between the lower block 310 and the upper block 330. In an embodiment, two intermediate blocks 320 may be installed on one lower block 310. Each intermediate block 320 includes a penetrating hole 321 penetrating vertically. The intermediate blocks 320 are arranged to have the penetrating holes 312 of the intermediate block 320 aligned with the penetrating holes 311, 312 of the lower block 310 one by one.

The upper block 330 may be disposed on an upper portion of the intermediate block 320, and may include a connection channel 331 formed therein. Both ends of the connection channel 331 fluidly communicate with the penetrating holes 321 of the intermediate block 320.

The connection block 350 is coupled to one side surface of the upper block 330. The connection block 350 is coupled with all of the plurality of upper blocks 330. The connection block 350 includes a connection channel 351 formed therein in the lengthwise direction, and fluidly communicates with the connection channels 331 of the respective upper blocks 330 through connection pipes 333. Accordingly, all of the upper blocks 330 fluidly communicate with one another by the connection block 350.

The valve 340 is installed to open and close the connection channel 315 of the lower block 310. In an embodiment, the valve 340 is disposed between the lower block 310 and the upper block 330, but an installation position of the valve 340 may vary.

In an embodiment, when the first oxygen collection tank T1 generates oxygen and the second oxygen collection tank T2 performs a cleaning operation, the first check valve 313 is opened and the second check valve 314 is closed. Accordingly, oxygen generated in the first oxygen collection tank T1 is conveyed to the connection channel 351 of the connection block 350 through the penetrating hole 321, the connection channel 331, and the connection pipe 333, and then is supplied to the oxygen tank TO through the oxygen conveyance pipe 421 and stored therein. In this case, at least a portion of the connection channel 315 may be opened by the valve 340, and, when at least a portion of the connection channel 315 is opened, a portion of the oxygen in the first oxygen collection tank T1 may be supplied to the second oxygen collection tank T2 as a purging gas.

When the first oxygen collection tank T1 performs a cleaning operation and the second oxygen collection tank T2 generates oxygen, the first check valve 313 is closed and the second check valve 314 is opened. Accordingly, oxygen generated in the second oxygen collection tank T2 is conveyed to the connection channel 351 of the connection block 350 through the penetrating hole 321, the connection channel 331, and the connection pipe 333, and then is supplied to the oxygen tank TO through the oxygen conveyance pipe 421. In this case, at least a portion of the connection channel 315 may be opened by the valve 340, and, when at least a portion of the connection channel 315 is opened, a portion of the oxygen in the second oxygen collection tank T2 may be supplied to the first oxygen collection tank T2 as a purging gas.

Figure 17:
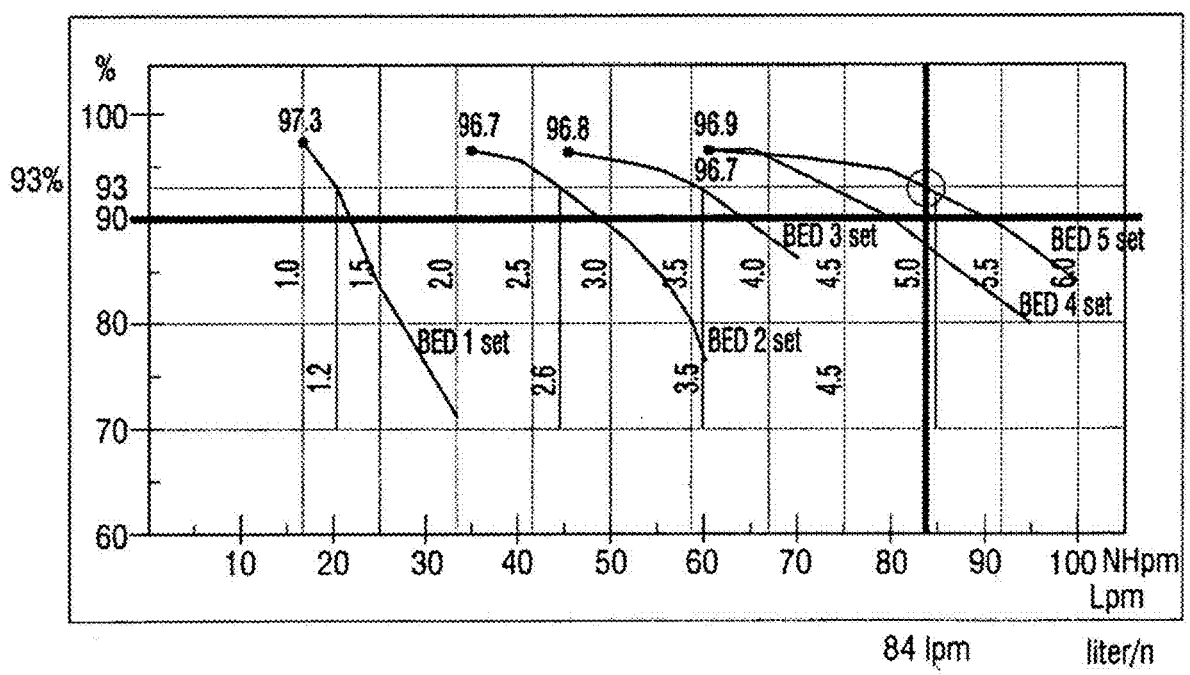
FIG. 17 is a view to illustrate an effect of the modular oxygen generator according to an embodiment.

FIG. 17 is a view to illustrate an effect of the above-described modular oxygen generator, and illustrates oxygen generation performance curves of modular oxygen generators provided with one bed, two beds, three beds, four beds, and five bend of the tank assembly 10, respectively.

In the drawing, the X-axis indicate an output of oxygen, and the Y-axis indicates purity of oxygen. In the case of the oxygen generator provided with one bed, as shown in the leftmost graph, as the amount of generated oxygen, the purity abruptly decreases. However, when the number of installed beds increases, the purity gently decreases even with an increase in the amount of generated oxygen. In the case of the oxygen generator provided with five beds, as shown in the rightmost graph, the amount of generated oxygen increases in comparison with the oxygen generators provided with one to four beds, and also, as the amount of generated oxygen increases, the purity of oxygen does not greatly decrease and high purity of about 85% appears.

It will be understood by a person skilled in the art that various modifications or change can be made based on the descriptions of the present disclosure. Therefore, the scope of the present disclosure is defined not by the detailed description of the embodiments but by the appended claims and equivalents thereto.

What is claimed is:

1. A modular oxygen generator comprising:
a tank assembly 10 having a plurality of tanks coupled with one another;
a lower pipe assembly 20 disposed on a lower portion of the tank assembly 10, and provided with pipes to supply air to the tank assembly and to discharge nitrogen; and
an upper pipe assembly 30 disposed on an upper portion of the tank assembly, and provided with pipes to discharge oxygen generated in the tank assembly,
wherein the tank assembly 10 comprises: a plurality of beds each of which is formed of a pair of oxygen collection tanks; an air tank TA storing air to be supplied to the oxygen collection tanks; and an oxygen tank TO receiving and storing oxygen from the oxygen collection tanks,
wherein the lower pipe assembly 20 comprises: a manifold 200 having an air supply channel and a nitrogen discharge channel formed therein, the air supply channel supplying air to the respective oxygen collection tanks from the air tank TA, the nitrogen discharge channel discharging nitrogen generated in the respective oxygen collection tanks to the outside; and a plurality of first valves 250 which are provided as many as a number of the beds and are coupled to the manifold, and open and close between the pair of oxygen collection tanks of each bed, and the air supply channel and the nitrogen discharge channel.

2. The modular oxygen generator of claim 1, wherein the manifold 200 comprises:
first to third channels 211, 212, 213 arranged in the manifold in parallel with one another; and
first and second upper openings 201, 202 formed on an upper surface of the manifold to fluidly communicate with the pair of oxygen collection tanks of each bed.

3. The modular oxygen generator of claim 2, wherein the first and second channels 211, 212 of the manifold are the nitrogen discharge channels, and the third channel 213 is the air supply channel.

4. The modular oxygen generator of claim 3, wherein the first valves 250 are attached to a lower surface of the manifold.

5. The modular oxygen generator of claim 4, wherein the first valves 250 operate to allow the first openings 201 and the third channel 213 to fluidly communicate with each other, and the second openings 202 and the second channel 212 to fluidly communicate with each other, or operate to allow the first openings 201 and the first channel 211 to fluidly communicate with each other, and the second openings 202 and the third channel 213 to fluidly communicate with each other.

6. The modular oxygen generator of claim 4, wherein the manifold further comprises a third upper opening 203 formed on an upper surface thereof to fluidly communicate with the air tank TA, and the third upper opening 203 and the third channel 213 are configured to fluidly communicate with each other in the manifold.

7. The modular oxygen generator of claim 6, wherein the manifold further comprises a fourth upper opening 204 formed on an upper surface thereof to fluidly communicate with the oxygen tank TO, and a side surface opening 205 formed on a side surface thereof, and
wherein the fourth upper opening and the side surface opening are configured to fluidly communicate with each other in the manifold.

8. The modular oxygen generator of claim 2, wherein the upper pipe assembly 30 comprises pipe blocks 300 installed on the upper portion of the tank assembly 10 as many as the number of the beds,
wherein each of the pipe blocks 300 comprises:
a lower block 310 comprising first penetrating holes 311, 312 fluidly communicating with the pair of oxygen collection tanks of the bed, respectively, check valves 313, 314 installed on the first penetrating holes 311, 312, and a first connection channel 315 connecting the first penetrating holes 311, 312;
an upper block 330 disposed on an upper portion of the lower block 310, and comprising a second connection channel 331 connecting the first penetrating holes 311, 312; and
a second valve 340 operating to open and close the first connection channel 315, and
wherein the upper blocks 330 of the respective pipe blocks 300 fluidly communicate with one another.

9. The modular oxygen generator of claim 8, wherein the upper pipe assembly 30 further comprises a connection block 350 connecting the plurality of upper blocks 330 with one another, and
    wherein the connection block 350 comprises a third connection channel 351 formed therein in a lengthwise direction, and the second connection channel 331 of the respective upper blocks 330 fluidly communicates with the third connection channel 351.

10. The modular oxygen generator of claim 9, wherein each of the pipe blocks 300 further comprises an intermediate block 320 interposed between the lower block 310 and the upper block 330 to space the lower block and the lower block apart from each other, and
    wherein the intermediate block 320 comprises second penetrating holes 321 connecting the first penetrating holes 311, 312 of the lower block 310 and the second connection channel 331 of the upper block.

11. The modular oxygen generator of claim 9, wherein the upper pipe assembly 30 comprises an oxygen conveyance pipe 421 connecting the third connection channel 351 of the connection block and the oxygen tank TO of the tank assembly.

\* \* \* \* \*